United States Patent
Sullivan et al.

(10) Patent No.: US 10,497,018 B1
(45) Date of Patent: Dec. 3, 2019

(54) METHOD AND SYSTEM TO ACCOUNT FOR PRICE VARIATION IN ATTRIBUTION MODELS IN ADVERTISING

(71) Applicant: STARCOM MEDIAVEST GROUP, Chicago, IL (US)

(72) Inventors: Sophia Dorothy Sullivan, Chicago, IL (US); Christopher Michael Strong, Winfield, IL (US)

(73) Assignee: STARCOM MEDIAVEST GROUP, Chicago, IL (US)

( * ) Notice: Subject to any disclaimer, the term of this patent is extended or adjusted under 35 U.S.C. 154(b) by 381 days.

(21) Appl. No.: 15/401,650

(22) Filed: Jan. 9, 2017

(51) Int. Cl.
*G06Q 30/02* (2012.01)
*G06Q 10/06* (2012.01)

(52) U.S. Cl.
CPC ..... *G06Q 30/0242* (2013.01); *G06Q 10/0631* (2013.01)

(58) Field of Classification Search
CPC ............... G06Q 30/0242; G06Q 10/0631

USPC ....................................................... 705/14.41
See application file for complete search history.

(56) References Cited

FOREIGN PATENT DOCUMENTS

CN 107103058 A * 8/2017

OTHER PUBLICATIONS

Valdislav Flaks, How to evaluate the cost efficiency of the attribution model, 2016 (Year: 2016).*

* cited by examiner

*Primary Examiner* — Tarek Elchanti
(74) *Attorney, Agent, or Firm* — Baker & McKenzie

(57) ABSTRACT

Within the field of advertising, attribution is the process of assigning credit to marketing activities for their contribution towards driving a desired marketing result. This invention discloses a data-driven solution that enables attribution to take into account the effect of price variation, using a number of approaches. Specifically, accounting for price variation enables a more accurate assessment of the impact of paid media.

26 Claims, 8 Drawing Sheets

| PRODUCT | % CHANGE IN PRICE (% DP) | % CHANGE IN QUANTITY DEMANDED (% DQ_D) | TYPICAL ELASTICITY VALUE (% DQ_D ÷ %DP) | TYPE OF ELASTICITY |
|---|---|---|---|---|
| INSULIN | +10% | 0% | .0 | PERFECTLY INELASTIC |
| BASIC TELEPHONE SERVICE | +10% | -1% | -.1 | INELASTIC |
| BEEF | +10% | -10% | -1.0 | UNITARILY ELASTIC |
| BANANAS | +10% | -30% | -3.0 | ELASTIC |

SOURCE: PRINCIPLES OF ECONOMICS, 9e, p. 10, KARL E. CASE, RAY C. FAIR & SHARON M. OSTER

METHOD AND SYSTEM TO ACCOUNT FOR PRICE VARIATION IN ATTRIBUTION MODELS IN ADVERTISING

FIELD OF THE INVENTION

This invention relates generally to techniques for measuring media effectiveness in advertising. More particularly, it relates to data-driven attribution models where the conversion event is a purchase with an associated price, monetary or otherwise. For example, for a consumer who ultimately exhibits a desired action, e.g., a product purchase or subscription, it relates to accounting for external factors and other marketing efforts while assigning credit to media events so the effect of the media touchpoints is not overestimated.

BACKGROUND OF THE INVENTION

Statistically-driven attribution models make it possible to understand which media touchpoints are most effective in driving conversions, in order to more efficiently allocate media budgets and maximize return on media investment. This invention discloses a specific area of variables in attribution models that account for the importance of price variation in the purchase decision.

BRIEF DESCRIPTION OF THE INVENTION

Attribution approaches initially developed within the online digital ad space. In the late-1990's, it was typical for the "last click" on a display or search ad to receive 100% of the "credit" for any visitor who ultimately "converted", which might mean any range of actions from a site visit to a purchase. However, by the mid-2000's, many agencies and ad technology vendors recognized that other marketing events in a consumer's exposure path should also potentially receive credit for contributing toward online conversions. Initially, these models were "rule-based", where position or order in a sequence, such as first click or last click, received some fixed proportion of a conversion credit. However, these rule-based models did a poor job of separating correlation from causality. They also required a domain expert to decide how to assign fractional credit within paths, didn't properly credit tactics that disproportionately appear in conversion paths, and didn't properly account for cross-channel interactions and the value of prospecting versus converting media. For all these reasons, by 2012, the industry largely recognized the need to apply "statistically-driven" attribution models, ranging from Bayesian Hierarchical Shrinkage (employed by Google 360, formerly Adometry) to linear discriminant analysis (employed by Visual IQ) to bagged logistic regression (employed by Turn).

Price is generally considered to be one of the most important levers that marketers can pull to generate more sales. It is one of the fundamental "Four P's" of marketing: Product, Place, Price, and Promotion. Once the product and place are established, price and promotion (advertising) are the two main areas left to drive sales, especially in low-involvement, high repeat-purchase cycle industries. Frequently, advertising consists of digital (e.g., Internet) and TV campaigns as well as price discounts and coupons simultaneously. Without taking into account the simultaneous price variations, the effectiveness of the media touchpoints is overestimated. Therefore, price variation is a critical aspect of attribution modeling.

When considering the inclusion of price variation metrics, they will be most effective if they are tailored to the specific industry and product line that is being modeled, as the correct metric(s) will vary widely across these. Two cases where price is an important factor but likely to be different in each model are as follows. In the consumer packaged goods (CPG) industry, companies change prices and run promotions as often as multiple times a day to compete with other category and store brands at the same time. In this case, a price variation metric may need to be calculated as frequently as daily. A second industry is the automotive industry. It is widely known that auto manufacturers roll out next year's models in the fall of the previous year, and auto dealers offer deep discounts on the previous models while running extensive media campaigns to inform consumers of these sales. In this case, a price variation metric might need to be calculated for each model of car on discount during this period but prices may not change very much during the rest of the year. Thus, the CPG and automotive industries have very different prices associated with their goods, but price variation is an important tool in both.

In spite of the importance of price variation in the purchase decision, the attribution modeling approaches employed by most vendors today do not account for price in their models for two main reasons. First, most attribution vendors provide out-of-the-box solutions with minimal or no customizable model variables. Their current solutions do not allow for the time to determine the specific price variation metrics for their clients. The second reason is because they do not have the data—either they do not have sales data, or they are unable to link it to the other data sources for attribution, such as media touchpoints. Their conversion events are other metrics such as "clicks," or proxies for purchases.

BRIEF DESCRIPTION OF THE DRAWINGS

FIG. 6 is an illustration of types of price elasticities;

DETAILED DESCRIPTION OF THE INVENTION

While the following detailed description contains many specifics for the purposes of illustration, those of ordinary skill in the art will recognize that many variations and alterations to the following details are possible within the scope of the invention. As such, the following implementation of the invention is set forth without loss of generality to, and without imposing limitations upon, the claimed invention.

Figure 1:
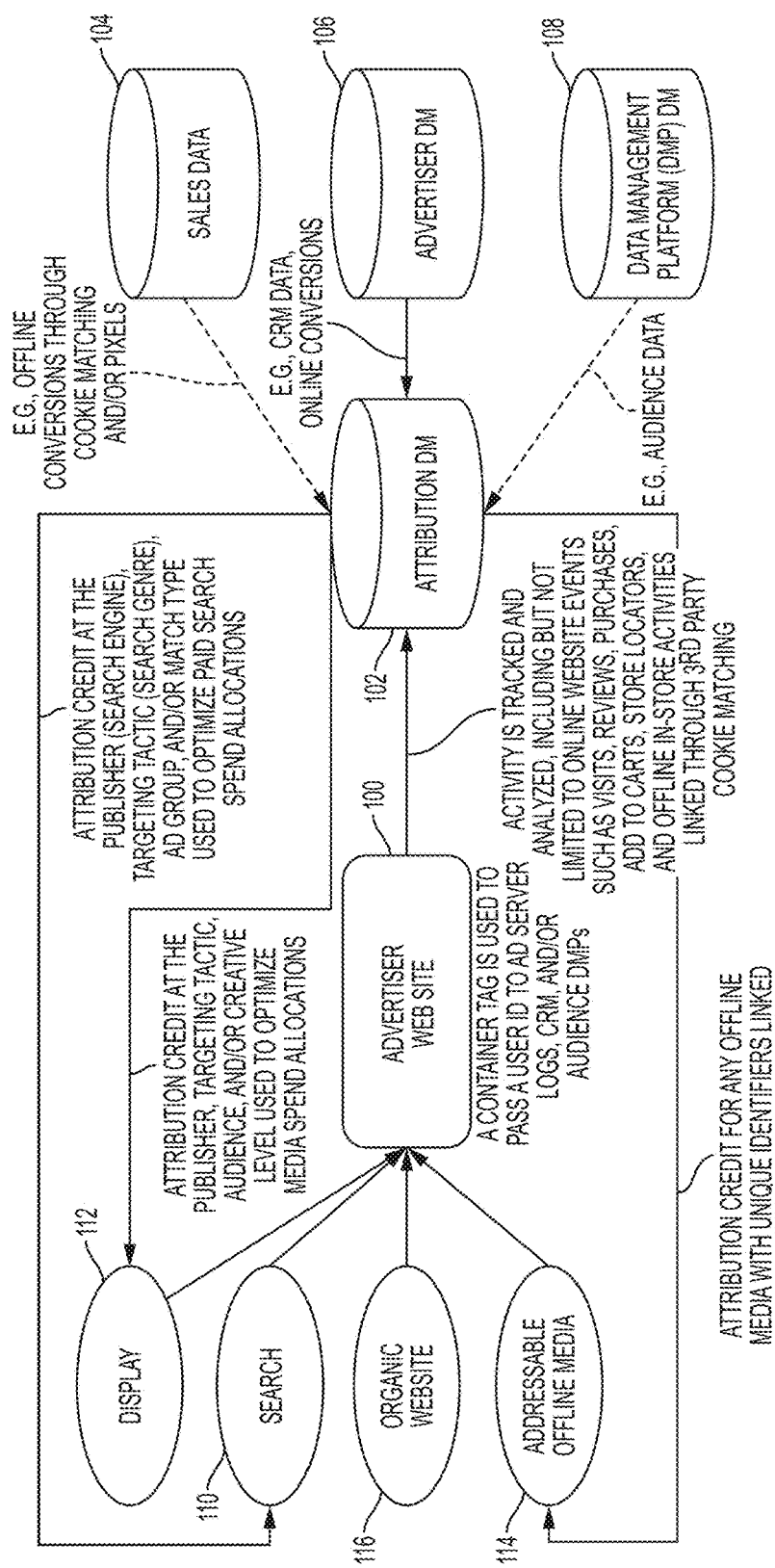
FIG. 1 is a diagram of the relationship among data sources used in the invention.

FIG. 1 illustrates a data infrastructure to categorize, bind, and automate data, reporting, modeling, and post-modeling analysis. Regarding the link from an advertiser website (100) to an attribution data mart (DM) (102), activity is tracked and analyzed, the activity including but not limited to online website events such as visits, reviews, purchases, add to carts, store locators, and offline in-store activities linked through third-party cookie matching. The attribution DM (or similar datasource) may comprise sales or purchase information for this analysis (104), and may also contain advertiser DM (106), and data management platform (DMP) DM (108) data. Attribution credit at the publisher (search engine), targeting tactic (search engine), ad group, and/or match type may be used to optimize paid search (110) spend allocations. Attribution credit at the publisher, targeting tactic, audience, and/or creative level, etc. may be used to optimize media spend allocations (display 112). A container tag is used to pass a user id to ad server logs, customer relationship management (CRM), and/or audience DMPs. Attribution credit may be assigned for any offline media (e.g., addressable offline media 114) with unique identifiers linked through third party cookie matching. One exemplary embodiment is a computer-implemented method for including consumer price sensitivity in an attribution model in an advertising environment. The method includes executing program instructions by at least one processor, causing the processor to calculate various price variation metrics and add them into an attribution dataset, fitting an attribution model to account for the effect of price variation on the customer purchase decision, and analyzing the outputs of the model to assess the overall effect of media spend and price variation on purchase behavior.

A conversion event is defined as an outcome desired by the advertiser that has a purchase price and some variation in said price. Conversion events may include, for example, purchasing an item or services at a store or online, or signing up for a subscription.

Media exposure events belong to either a paid owned, earned or unpaid media channels. Examples of paid media channels include: online digital display advertising; online paid search (SEM); paid social; addressable television; and content delivery (e.g., email). Examples of owned media channels include the company's desktop and mobile websites, blogs, and any social media channels. Earned media include social activity such as mentions, shares, reposts, and likes. Finally, unpaid media channels include organic (natural) search (SEO), or direct to website (i.e., organic website).

The price variation metrics reflect that there is a difference between the actual price paid by the customer, including discounts and coupons, and the suggested retail price for the item. The metrics fall into three main categories: a) indicator variables, b) normalizations, and c) elasticities. Indicator variables (also known as dummy variables, design variables, Boolean indicators, categorical variables, binary variables, or qualitative variables) are variables that take the form 0 or 1 to indicate the presence or absence of an attribute. For example, whether the product is discounted at the time of purchase (1) vs. no discount (0), or whether the price is lower than the customer's usual purchase price (1) vs. not (0). Normalized variables are variables that are calculated relative to a reference price, such as the regular, non-discounted price of the product. Price elasticity is a metric used in economics to measure consumer sensitivity to changes in price. Price elasticity is of the form:

$$e_{(p)} = \frac{dQ/Q}{dP/P}$$

with the change in quantity sold, dQ, quantity sold, Q, change in price, dP, and price, P. The elasticity, $e_{(p)}$ is calculated using methods which may include but are not limited to regression, arc elasticity (two points only), point-price elasticity, and total-outlay.

The chosen price variation metric(s) are calculated along at least one dimension in the data, including but not limited to purchase, individual, household, product, product category, timeframe (such as daily, weekly, monthly, around major holidays or events), store, demographics, geographical location, or any combination of the aforementioned dimensions, i.e., product x week.

The calculated price variation metrics are added as variables along the proper dimensions in the model dataset.

An attribution model of choice is fit on the model dataset with at least one price variation metric included.

Fractional credit is allocated to the media touchpoints, price variation metrics, and any other variables included in the model.

In addition, the above-described embodiment could include calculating the price variation metrics on a quantity that is the total of some number other than quantity sold, which may include but is not limited to duration of subscription, volume, weight, or length.

In addition, the above-described embodiments could include removing data outliers based on quantity purchased using criteria which may include but is not limited to confidence intervals, percentiles, or numerical thresholds.

In addition, the above-described embodiments could further include removing outliers in the calculated metrics according to criteria that include but are not limited to confidence intervals, percentiles, or numerical thresholds. Dimensions without price variation metrics may be assigned a metric value of 0, N/A, etc.

In addition, the above-described embodiments could further include binning (also called bucketing, discretizing, or chopping) the price variation metrics into categories using methods including, but not limited to the Sturges' rule, Scott's rule, Freedman-Diaconis rule, or a custom machine learning method.

In addition, the above-described embodiments could further include calculating the correlations between the all price variation metrics to assess their inclusion in the model. These correlations may be calculated using methods including, but not limited to Pearson's or Spearman correlations.

In addition, the above-described embodiments could further include building response curves for the media coefficients based on fractional credit and cost data over time. These response curves are used to optimize the allocations of future media spend to higher-performing media channels.

The embodiments may also further include: with respect to account for customer sensitivity to price variation in attribution models in advertising, obtaining and merging media, customer action, and customer purchase event log file datasets;

calculating price variation metrics from the purchase information and adding them into the attribution model dataset;

fitting an attribution model on the data with the price variation metrics included; and calculating the fractional credit for the price variation metrics, media events, and any other variables included in the model.

The embodiments may also include:
  identifying which customer activities represent purchase-type conversion events for which price variation needs to be measured, having gross price and discounted price information;
  obtaining data with media and customer action events for attribution, including converters and non-converters;
  combining data sources to create the attribution dataset;
  removing purchase outliers and/or ids with purchase outliers based on the distribution of purchases;
  using the purchase data, calculating the price variation metrics along the dimensions of interest;
  removing outliers in the price variation metrics based on the distribution of these metrics and/or their significance;
  creating categorical buckets for the continuous price variation metrics;
  adding the calculated price variation metrics along each dimension as variables in the attribution dataset;
  calculating correlations on the price variation metrics and other variables to assess inclusion in the attribution model; and
  fitting the attribution model with all or the uncorrelated price variation metrics included in order to account for the importance of price variation in the customer purchase decision;
  calculating fractional credit for the media events, price variation metrics, and any other variables included in the model; and
  creating response curves for media coefficients from the model based on fractional credit and media spend data over time.

Consistent with the present invention, there are other ways this method can be adapted or altered for various purposes.

Figure 2:
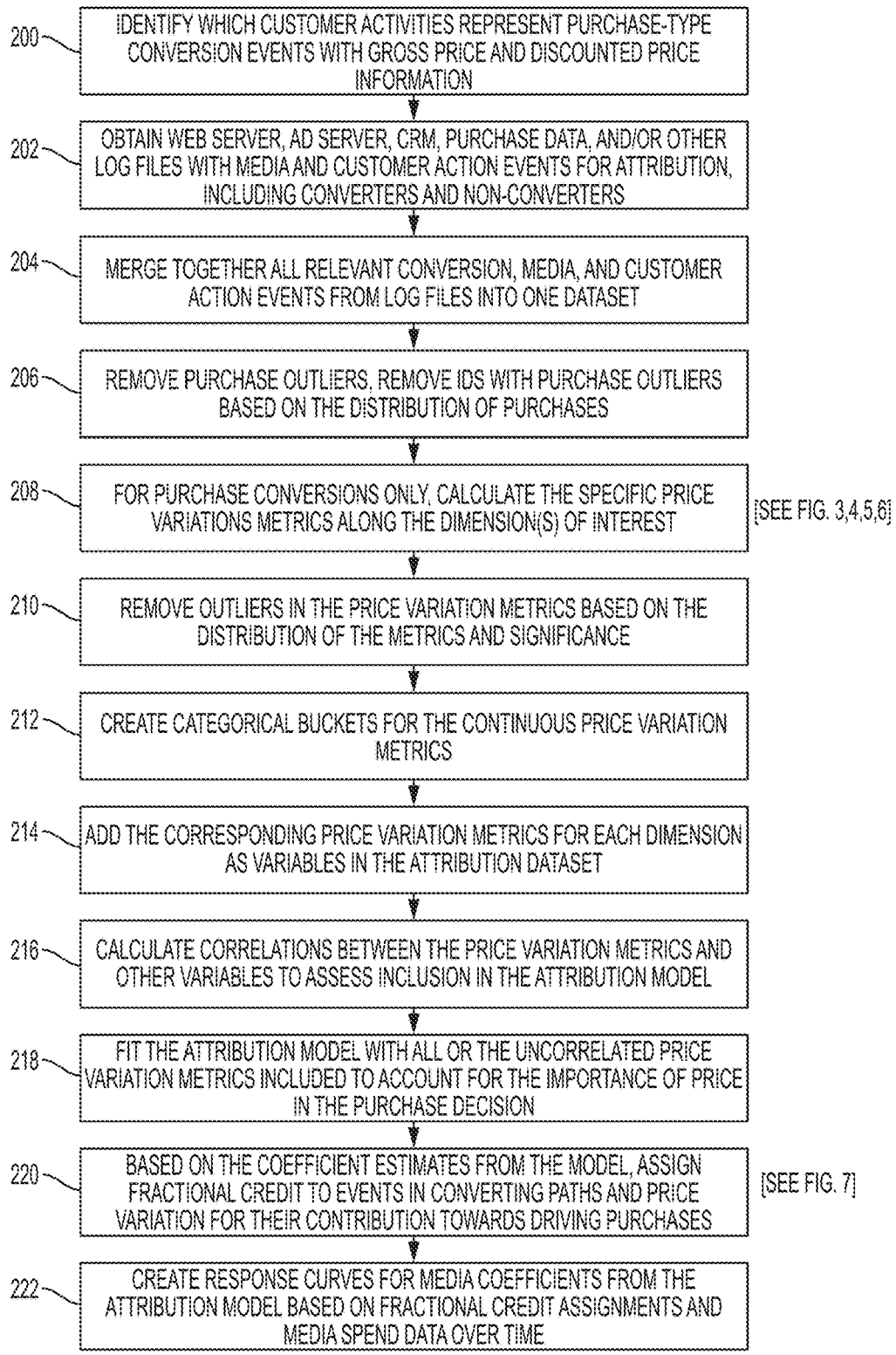
FIG. 2 is a process flow of one embodiment of the invention.

As shown in FIG. 2, the first step 200 to account for price variation in an attribution model is determining whether a conversion event is dependent on price. If so, the original and discounted prices need to be obtained for each purchase event, as well as the quantity purchased. It is important to note that there must be some variation in the purchase prices of these purchase events. If all items are sold at the same price and there is never any discount, there is no use for price variation metrics.

Once conversion event(s) are identified, the next step 202 is to obtain relevant and available data from sources which could be useful for understanding conversion behavior. These usually include web server, ad server, CRM, purchase data, and/or other media log files.

The next step 204 is to merge the data sources into one dataset. The method for doing this depends largely on the type of modeling being used, but some methods are using cross log file tagging, implementing a container tag, and/or working with third-party user id matching partners. The end result is usually (but not always) a "path" for a specific household with timestamped media touchpoints and conversion events.

The purchase events may comprise the data points used in the calculation of the price variation metrics, although the dimensions along which they are calculated depend on the features of the other data sources. Depending on the source(s) of the purchase data, there may be data anomalies, negative sales due to returns, or extremely large purchases by resellers, so the next step 206 is to remove these "outliers" from the purchase data. In this case, outliers are selected to be those with a sales quantity above the $99.99^{th}$ percentile. A long-tail distribution may be typical for low-involvement, high repeat purchase cycle products. Given that it is not a normal distribution, a standard-deviation approach is ill-specified. All IDs with any purchase quantity outside the upper percentile limit are removed from the dataset.

Metric Calculation: Once the outliers are removed, the price variation metrics themselves are calculated along each dimension of interest (step 208). For each purchase, several metrics must be calculated (if they are not already included in the purchase data). Total amount sold, original price, and effective price after discount/promotion are the key variables. The most basic price variation metric is the indicator variable that simply represents, for each purchase, whether the product was "on sale" (with a value of 1) or not (with a value of 0). But there are a variety of more complex metrics that can be calculated.

Metric Validation and Assessment: The next step 210 is to verify the price variation metrics. In the case of regressions, the obtained elasticity values are examined before including them in the model. A first check is to assess whether the coefficient returned by the regression is statistically significant. If not, the approximated elasticity value should not be included in the attribution model. Additionally, depending on the dimension, the data cut may be too small, and regressions on that set of observations may yield invalid results. In this case, elasticities that are based on 10 or fewer observations are removed, as are those with insignificant coefficients, and coefficient values that are less than −20. Each metric should be carefully examined (where possible) before inclusion in the dataset.

For many of these metrics, the continuous variables may not have enough variation for the model to draw meaningful conclusions. Therefore, calculating a categorical or "bucketed" version may be useful as a representative or to reduce noise. (step 212). When using the bucketing algorithms in software such as "R" statistical analysis software, it is a good idea to make sure the number of buckets is large enough to capture the nuances of the distribution. Once the metrics and buckets are calculated for each dimension, they then need to be included in the model dataset in the corresponding records. (step 214).

For example, if the dimensions chosen were store and month, the regressions would be calculated on the subset of data obtained from each combination of store and month. All the records of purchases for store X in month Y would then be assigned a new variable that is the elasticity value calculated for store X in month Y. One way to do this is by using a dictionary-type structure in Python, for example.

Because as many price metrics as desired can be calculated, correlations might be calculated between the metrics to decide which to include in the model. (step 216). Some models will automatically remove variables that are collinear or multicollinear (i.e., survival models), however, other models, such as logistic regression, are sensitive to highly correlated variables.

Metric Deployment: Step 218 is to fit the attribution model of choice with the chosen price variation metric(s). Depending on the type of model chosen and the data size, different programs or custom algorithms may be chosen. The final results will give a more accurate estimate of the importance of media touchpoints than a model without price variation metrics included.

Once the model is finished, there are several key outputs that should be built from the results in order to be able to interpret and communicate insights to media teams. A common practice with many attribution models is to use the model coefficients to assign fractional credit for media touchpoints (220). One possible way to do this is to, at the path level, assign value proportionally to each touchpoint based on the relative size of each of the coefficients. If a converting path has two touchpoints and one coefficient is twice the size of the other, it should receive twice the credit. The credit can then be summed for all of the different kinds of media across all the touchpoints on converting paths to get a breakdown of the total credit of media, price, and other control variables. An effective way to do this is with a pie chart—the larger the slice of the pie, the larger the effect of each factor on purchases during the time period of the model data set.

As shown at step 222, response curves for media coefficients can be created. The response curves are created from the attribution model based on fractional credit assignments and media spend data over time.

Figure 3:
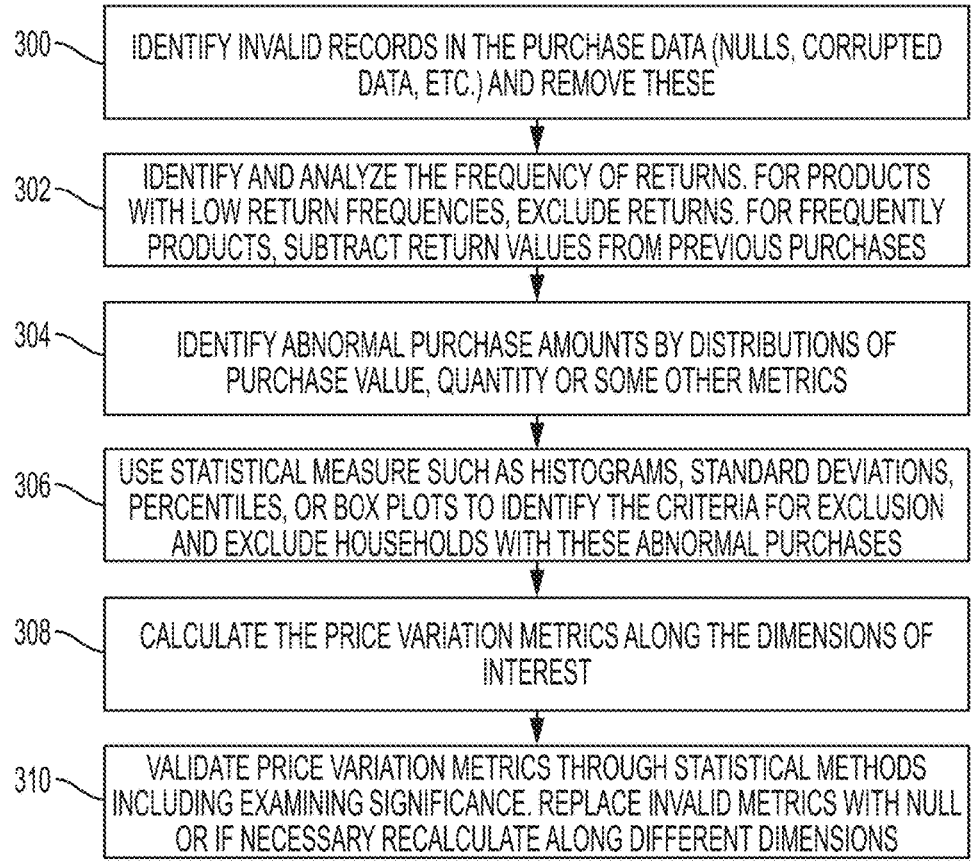
FIG. 3 is a process flow illustrating how outliers may be removed.

FIG. 3 is a flow chart that illustrates how "outliers", which should not be used in the calculations of price sensitivity due to their anomalous nature, can be removed from the data. At step 300, invalid records due to corrupted data or null sets, etc., are removed without further analysis. At step 302, return data are analyzed. For products where returns are infrequent, data regarding returns may simply be excluded. For products that are frequently returned, return values may be subtracted from previous purchases.

At step 304, abnormal purchase amounts may be excluded from the data. As an example, there may be a reason for an individual to buy a large quantity of items that are normally purchased in small quantities—for example, where the items are given as gifts or resold. Such purchases are anomalous and can be excluded. At step 306, statistical measures are used to identify and remove data or exclude households that correspond to abnormal purchases. At step 308, price variation metrics are calculated along dimensions of interest. Step 310 shows the validation of price variation metrics through statistical methods, and recalculation along different dimensions if needed.

Figure 4:
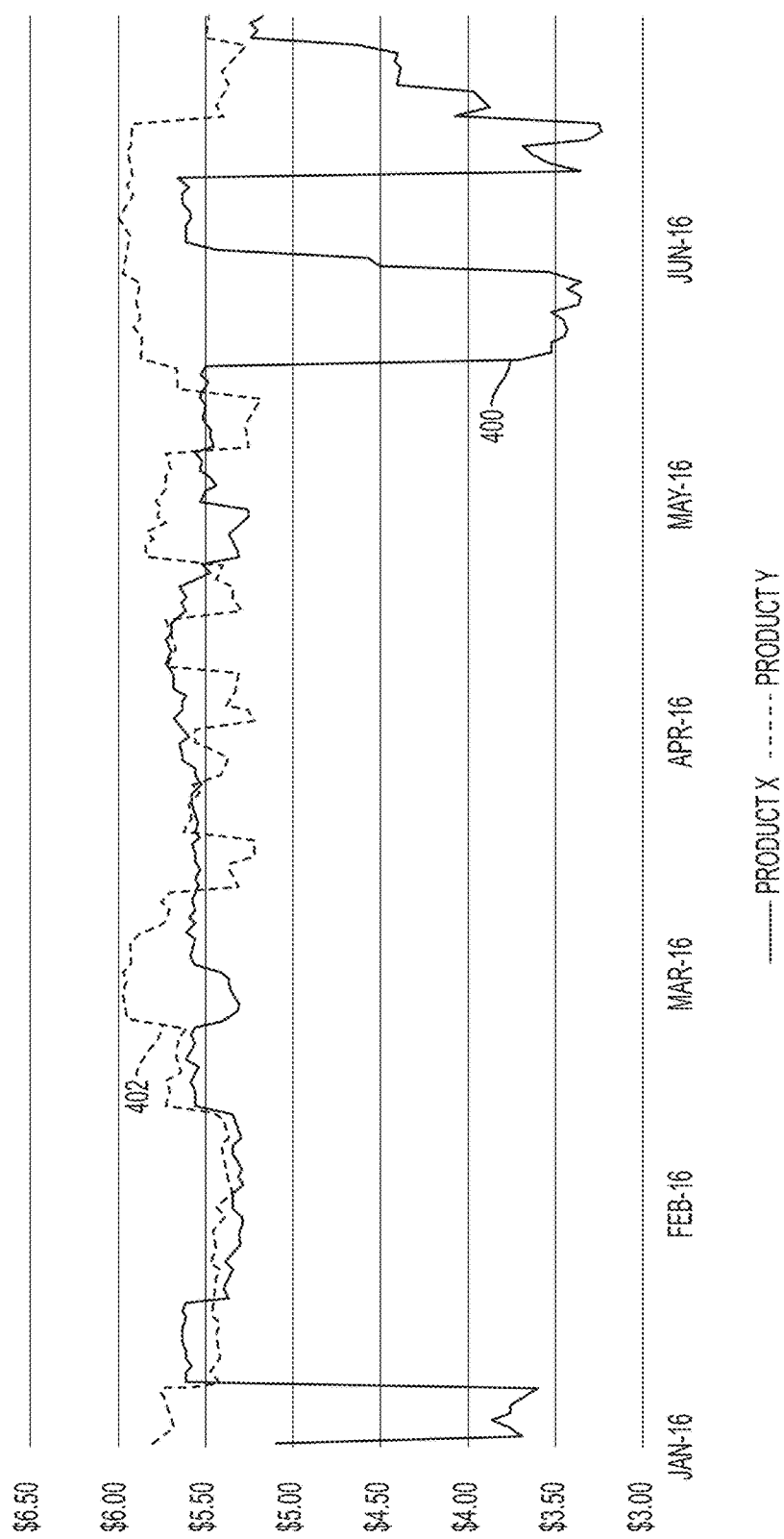
FIG. 4 is an illustration of average daily net prices for two CPG products.

FIG. 4 is an illustrative example of price variation for two products. It illustrates two different ways that prices may vary over time. Product X (400) has a fairly consistent price during most weeks, but has deeply discounted prices multiple times in the year. Product Y (402) does not have any deep discounts, but has more variation on a weekly basis. Both of these products have sufficient price variation such that price variation metrics can be calculated based on the purchase data.

Figure 5:
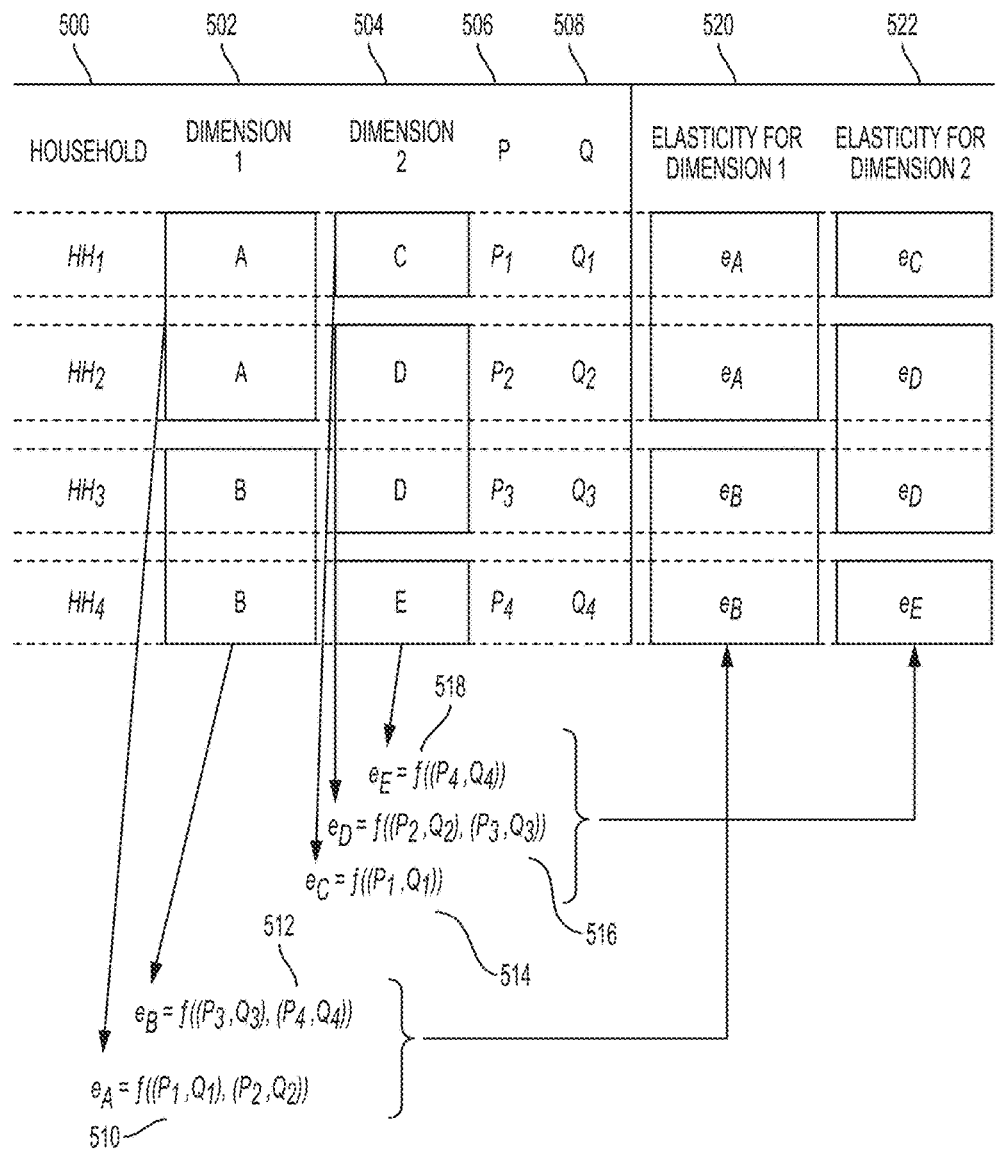
FIG. 5 is a representation of how price metrics are calculated along different dimensions.

FIG. 5 is an illustration of how the attribution data is divided in order to calculate the elasticity values along each dimension of interest. The four records correspond to purchases made by four different households—$HH_1$, $HH_2$, $HH_3$, and $HH_4$ (500). The first dimension of interest, Dimension 1 (502), could be the store at which the purchase is made, so for this example there are two stores in the dataset—Store A and Store B. Dimension 2 (504) could be day of the week—Day C, Day D, or Day E. P (506), the price of that purchase, is the final price paid by each household, including discounts and possibly coupons. Q (508) is the quantity of the product that each household bought. To calculate the elasticity along the store dimension, the purchase and quantity data is split along the different values. Since $HH_1$ and $HH_2$ both made their purchases at Store A, the price variation metric; elasticity, for example, for Store A, $e_A$, is calculated using their purchase data (510). Similarly, the purchase data for $HH_3$ and $HH_4$ is used to calculate the elasticity for Store B, $e_B$ (512). The other dimension of interest is day of the week. The purchase data is again broken into subsets by each value of day of the week. Since $HH_1$ is the only household that purchased on Day C, the elasticity for that day, $e_C$, is calculated using only that household's purchase data (514). The elasticities for Day D, $e_D$, and Day E, $e_E$, are calculated using the purchase data from $HH_2$ and $HH_3$ (516), and $HH_4$ (518), respectively. Each purchase record then has an elasticity along Dimension 1 (520) and an elasticity along Dimension 2 (522). Since $HH_1$ and $HH_2$ purchased at Store A, they are assigned $e_A$, and $HH_3$ and $HH_4$ are assigned $e_B$. The elasticities for Dimension 2 are assigned in the same way.

FIG. 6 is an exemplary illustration of several products and typical price elasticity values of each product (calculated along the product dimension). The first calculation that must be performed is the percent change in price (600). Ten percent is used as a standard for the illustration. Next, the percent change in quantity demanded as a result of these price changes must be calculated (602). Then, the percent change in price is divided by the percent change in quantity demanded (604), which is usually negative. The magnitude of the calculated elasticity value determines what kind of demand there is for the product (606). Since the demand of insulin (typically) does not change with a 10% price increase, insulin is considered perfectly inelastic. At the opposite end of the spectrum is bananas, for which there are many other substitutes, and demand will drop further than the price change, so bananas are classified as elastic.

Figure 7:
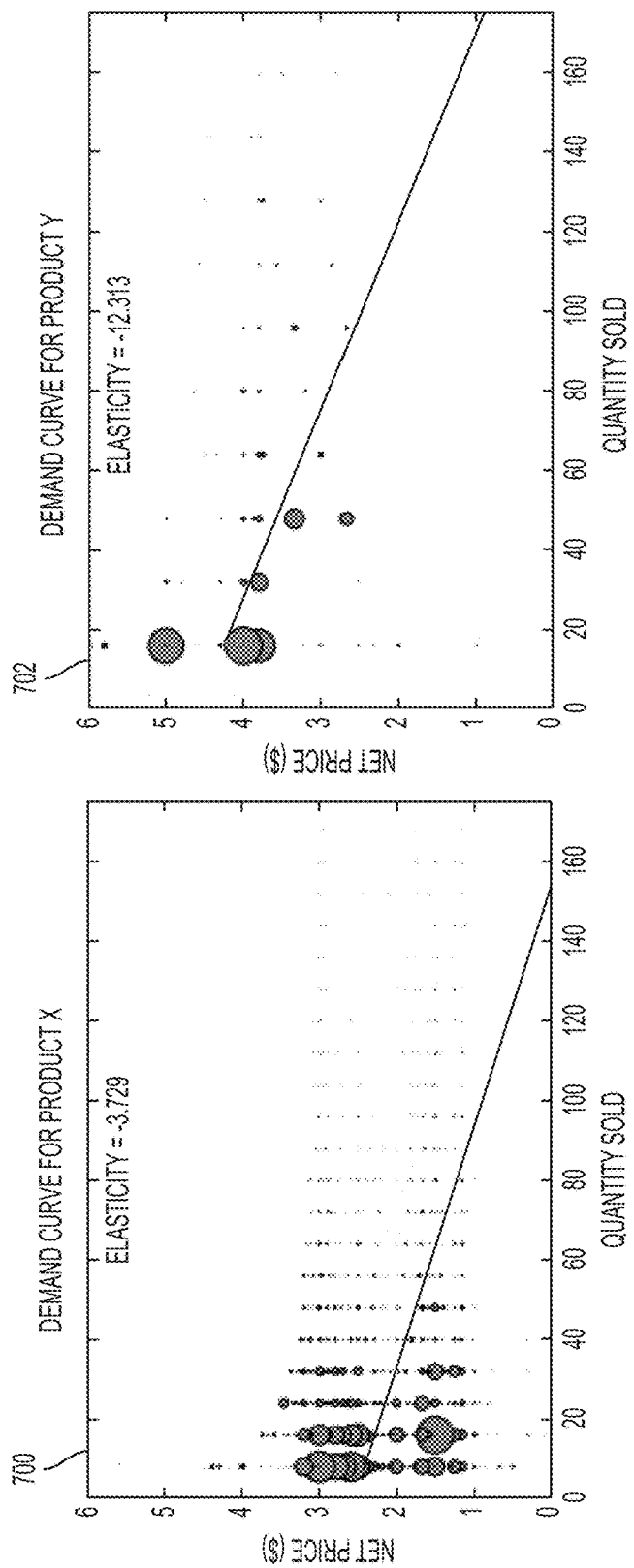
FIG. 7 is an illustration of demand curves.

FIG. 7 is an exemplary illustration of two different products in the CPG industry, and the corresponding demand data along with the calculated elasticity values, again calculated along the product dimension. The size of the points on the scatter plots reflect the relative amount of the product sold at each price point. The elasticities for both products are calculated using linear regression. Product X (700) has an elasticity value of −3.729, which means demand is elastic. Product Y (702) has an elasticity value of −12.313, which means that demand for product Y is more elastic than that of Product X.

Figure 8:
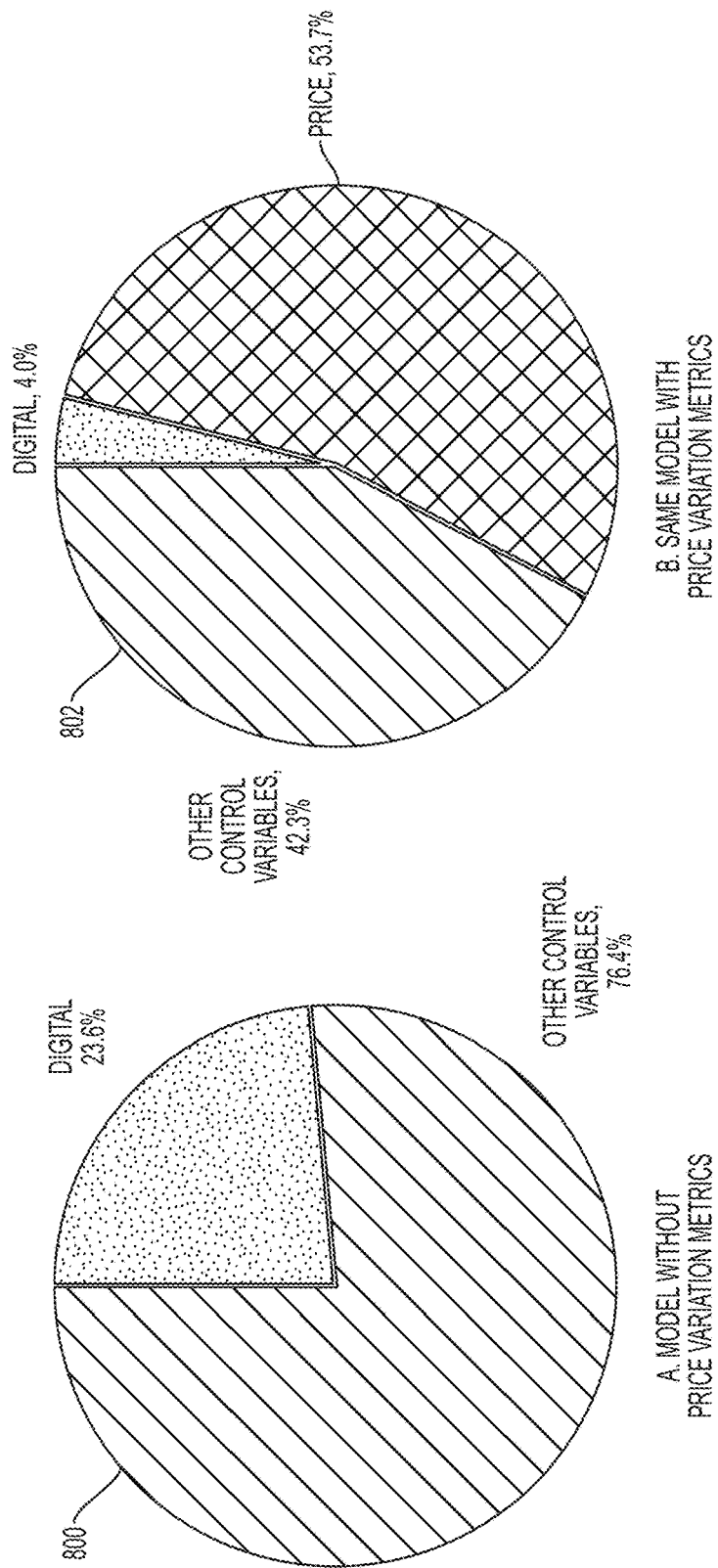
FIG. 8 is an exemplary comparison analysis of two attribution models fit with and without price variation metrics.

FIG. 8 is an illustration of total fractional credit from two attribution models that are identical in every way (data, specification, etc.) with the one exception that model A (800) does not include any price variation metrics, while model B (802) does. If the contribution of digital media is the variable of interest (and it often is in attribution), the model without including price variation could report that the effectiveness of digital marketing efforts is 23.6%, which is more than five times higher than reported by the identical model that included price variation metrics (4.0%). This example illustrates that excluding price variation from attribution models can lead to overestimation of the effectiveness of marketing methods. Additionally, summarizing the fractional credit for the price variation metrics allows the model to determine how much of an effect price variation actually has on purchase events. In this example, price accounts for over half of the variation in purchase behavior.

Response curves are another important aspect of the attribution modeling process, and they are created using the allocation of fractional credit and media spend data over time (222). Data points for the response curves typically consist of the total fractional credit and media spend for a given period of time. Depending on the amount of media spend, one data point may consist of a month or a week of data. After collecting 3-4 months of data and aggregating the results, a curve can be fit for the different media channels included in the model. These curves are then used to allocate future media budgets such that the responses for each channel are maximized according to a specific budget or target.

We claim:

1. A computer-implemented method of accounting for consumer price sensitivity in attribution models, the method comprising:
- obtaining log files comprising individual identifiers, purchase event data, media event data and customer action data;
- merging the purchase event data, the media event data and the customer action data from the log files to create an attribution dataset;
- calculating price variation metrics on the purchase event data along at least one dimension, wherein the price variation metrics comprise three forms: indicators, normalizations, and elasticities;
- adding the price variation metrics into the attribution dataset along at least one dimension;
- fitting an attribution model on the attribution dataset with at least one price variation metric included;
- using model coefficients of the attribution model based at least in part on the price variation metric to assign fractional credit to media channels; and
- allocating a media budget based on the fractional credit assignment.

2. The method of claim 1, wherein in the calculating the price variation metrics, the at least one dimension comprises an individual.

3. The method of claim 1, wherein in the calculating the price variation metrics, the at least one dimension comprises a household.

4. The method of claim 1, wherein in the calculating the price variation metrics, the at least one dimension comprises a product.

5. The method of claim 1, wherein in the calculating the price variation metrics, the at least one dimension comprises a timeframe.

6. The method of claim 1, wherein in the calculating the price variation metrics, the at least one dimension comprises a combination of at least two dimensions.

7. The method of claim 6, wherein the at least two dimensions comprise product x week.

8. The method of claim 1, wherein an elasticity metric, denoted as e, is of the form $$e_{(p)} = \frac{dQ/Q}{dP/P}$$

where dQ is the change in quantity sold, Q is the quantity sold, dP is the change in price, and P is the price; and price elasticity, $e_{(p)}$ is calculated using one of the following methods: regression, arc (two points), point-price, or total-outlay.

9. The method of claim 1, further comprising removing outliers in the purchase event data.

10. The method of claim 9, wherein the removing outliers is based on a distribution of purchase value.

11. The method of claim 1, further comprising removing outliers or invalid price variation metrics from the purchase event data.

12. The method of claim 1, further comprising bucketing the calculated price variation metrics into discrete bins.

13. The method of claim 1, further comprising calculating correlations between the price variation metrics.

14. The method of claim 1, further comprising creating response curves from the fractional credit determined by the model coefficients.

15. A computer-implemented method of accounting for consumer price sensitivity in attribution models, the method comprising:
- obtaining log files comprising individual identifiers, purchase event data, media event data and customer action data;
- merging the purchase event data, the media event data and the customer action data from the log files to create an attribution dataset;
- calculating price variation metrics on the purchase event data along at least one dimension, wherein the price variation metrics comprise three forms: indicators, normalizations, and elasticities;
- removing outliers in the purchase event data;
- adding the price variation metrics into the attribution dataset along at least one dimension;
- fitting an attribution model on the attribution dataset with at least one price variation metric included;
- using model coefficients of the attribution model based at least in part on the price variation metric to assign fractional credit to media channels; and
- allocating a media budget based on the fractional credit assignment.

16. The method of claim 15, wherein in the calculating the price variation metrics, the at least one dimension comprises a combination of at least two dimensions.

17. The method of claim 15, wherein
- the removing outliers comprises using statistical measures comprising histograms, standard deviations, percentiles, or box plots, and
- the method further comprises excluding households with at least one abnormal purchase based on one or more of the statistical measures.

18. The method of claim 9, wherein
- the removing outliers comprises using statistical measures comprising histograms, standard deviations, percentiles, or box plots, and
- the method further comprises excluding households with abnormal purchase based on one or more of the statistical measures.

19. A non-transient computer-readable medium containing program instructions for causing a computer to perform the steps of:
- obtaining log files comprising individual identifiers, purchase event data, media event data and customer action data;
- merging the purchase event data event, the media event data and the customer action data from the log files to create an attribution dataset;
- calculating price variation metrics on the purchase event data along at least one dimensions of interest, wherein the price variation metrics comprise three forms: indicators, normalizations, and elasticities;
- adding the price variation metrics into the attribution dataset along the least one dimensions;
- fitting an attribution model on the attribution dataset with at least one price variation metric included;
- using model coefficients of the attribution model based at least in part on the price variation metric to assign fractional credit to media channels; and
- allocating a media budget based on the fractional credit assignment.

20. The medium of claim 19, wherein in the calculating the price variation metrics, the at least one dimension comprises an individual.

21. The medium of claim 19, wherein in the calculating the price variation metrics, the at least one dimension comprises a household.

22. The medium of claim 19, wherein in the calculating the price variation metrics, the at least one dimension comprises a product.

23. The medium of claim 19, wherein in the calculating the price variation metrics, the at least one dimension comprises a timeframe.

24. The medium of claim 19, wherein in the calculating the price variation metrics, the at least one dimension comprises a combination of at least two dimensions.

25. The medium of claim 24, wherein the at least two dimensions comprise product x week.

26. The method of claim 15, wherein an elasticity metric, denoted as e, is of the form $$e_{(p)} = \frac{dQ/Q}{dP/P}$$

where dQ is the change in quantity sold, Q is the quantity sold, dP is the change in price, and P is the price; and price elasticity, $e_{(p)}$ is calculated using one of the following methods: regression, arc (two points), point-price, or total-outlay.

* * * * *